United States Patent
Honma et al.

(10) Patent No.: US 10,252,719 B2
(45) Date of Patent: Apr. 9, 2019

(54) CONTROL DEVICE FOR CONTINUOUSLY VARIABLE TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Tomoaki Honma, Isehara (JP); Yuta Suzuki, Sagamihara (JP); Itaru Shinohara, Atsugi (JP); Hiroshi Sekiya, Atsugi (JP); Hiromu Ogino, Yamato (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 112 days.

(21) Appl. No.: 15/324,885

(22) PCT Filed: May 27, 2015

(86) PCT No.: PCT/JP2015/065205
§ 371 (c)(1),
(2) Date: Jan. 9, 2017

(87) PCT Pub. No.: WO2016/006346
PCT Pub. Date: Jan. 14, 2016

(65) Prior Publication Data
US 2017/0197623 A1    Jul. 13, 2017

(30) Foreign Application Priority Data
Jul. 9, 2014  (JP) .................................. 2014-141742

(51) Int. Cl.
*B60W 30/18* (2012.01)
*B60W 10/02* (2006.01)
(Continued)

(52) U.S. Cl.
CPC .... *B60W 30/18054* (2013.01); *B60W 10/026* (2013.01); *B60W 10/107* (2013.01);
(Continued)

(58) Field of Classification Search
CPC ......... B60W 30/18054; B60W 10/026; B60W 10/107; B60W 2520/04; B60W 2520/10;
(Continued)

(56) References Cited

U.S. PATENT DOCUMENTS

| 4,779,417 A | 10/1988 | Kita |
| 4,962,678 A | 10/1990 | Murano et al. |

(Continued)

FOREIGN PATENT DOCUMENTS

| JP | 05-126238 A | 5/1993 |
| JP | 2000-213638 A | 8/2000 |

(Continued)

OTHER PUBLICATIONS

U.S. Appl. No. 15/324,897, filed Jan. 9, 2017, Honma et al.
(Continued)

*Primary Examiner* — Jacob S. Scott
*Assistant Examiner* — Tinh Dang
(74) *Attorney, Agent, or Firm* — Foley & Lardner LLP

(57) ABSTRACT

A control device for a continuously variable transmission includes a lock-up clutch of a torque converter which is arranged to connect and disconnect a power transmission between a power source and the driving wheel, and a control section configured to output a hydraulic pressure command value. The control section is configured to control a transmission gear ratio of the continuously variable transmission and an engagement state of the lock-up clutch in accordance with a traveling state of a vehicle. The control device includes a learning control section configured to perform a learning control of the engagement state of the lock-up (Continued)

clutch with respect to the hydraulic pressure command value, an oil vibration sensing section configured to sense oil vibration of a line pressure, and a learning control prohibiting section configured to prohibit the learning control when the oil vibration sensing section senses the oil vibration.

10 Claims, 5 Drawing Sheets

(51) Int. Cl.
  *B60W 10/107* (2012.01)
  *F16H 61/00* (2006.01)
  *F16H 61/02* (2006.01)
  *F16H 61/662* (2006.01)
  *F16H 61/14* (2006.01)

(52) U.S. Cl.
  CPC ........... *F16H 61/14* (2013.01); *F16H 61/662* (2013.01); *B60W 2520/04* (2013.01); *B60W 2520/10* (2013.01); *B60W 2710/024* (2013.01); *B60W 2710/1005* (2013.01); *F16H 2061/0087* (2013.01)

(58) Field of Classification Search
  CPC ..... B60W 2710/024; B60W 2710/1005; F16H 61/0021; F16H 61/02; F16H 2061/0087
  See application file for complete search history.

(56) References Cited

U.S. PATENT DOCUMENTS

| | | | |
|---|---|---|---|
| 5,031,481 A | 7/1991 | Algrain et al. | |
| 5,157,992 A | 10/1992 | Hayashi et al. | |
| 5,249,483 A | 10/1993 | Iizuka | |
| 5,598,335 A | 1/1997 | You | |
| 5,782,718 A | 7/1998 | Wakahara | |
| 7,558,660 B2 * | 7/2009 | Izumi | F16H 61/66272 477/38 |
| 8,287,431 B2 * | 10/2012 | Kobayashi | B60W 10/06 477/110 |
| 9,939,063 B2 | 4/2018 | Honma et al. | |
| 2001/0039470 A1 | 11/2001 | Fessler | |
| 2009/0234546 A1 | 9/2009 | Inoue et al. | |
| 2011/0048552 A1 | 3/2011 | Dohi et al. | |
| 2013/0136623 A1 | 5/2013 | Hwang et al. | |
| 2016/0356380 A1 | 12/2016 | Hashimoto et al. | |

FOREIGN PATENT DOCUMENTS

| | | |
|---|---|---|
| JP | 2002-227984 A | 8/2002 |
| JP | 2005-003065 A | 1/2005 |
| JP | 2008-089146 A | 4/2008 |
| JP | 2012-219947 A | 11/2012 |
| JP | 2013-113437 A | 6/2013 |

OTHER PUBLICATIONS

U.S. Appl. No. 15/324,880, filed Jan. 9, 2017, Honma et al.
U.S. Notice of Allowance dated Dec. 7, 2017 issued in co-pending U.S. Appl. No. 15/324,880.
U.S. Office Action dated Aug. 8, 2017 as issued in corresponding U.S. Appl. No. 15/324,880.
U.S. Non-Final Office Action dated Aug. 10, 2018 issued in co-pending U.S. Appl. No. 15/324,897.

\* cited by examiner

CONTROL DEVICE FOR CONTINUOUSLY VARIABLE TRANSMISSION

TECHNICAL FIELD

This invention relates to a control device for a continuously variable transmission mounted on a vehicle.

BACKGROUND ART

Conventionally, a patent document 1 discloses an art to sense a relationship between a hydraulic pressure control command value to an engagement element, and an engagement start timing, and to perform a learning control of the hydraulic pressure control command value corresponding to the engagement start timing.

However, when the oil vibration in which the hydraulic pressure such as the line pressure is varied when the engagement start timing is sensed, vibrating engagement is generated during the learning control to provide the unnatural feeling to the driver.

PRIOR ART DOCUMENT

Patent Document

Patent Document 1: Japanese Patent Application Publication No. H05-126238

SUMMARY OF THE INVENTION

It is an object to provide a control device for a continuously variable transmission devised to solve the above-mentioned problems, and to perform the learning control while suppressing the unnatural feeling to the driver.

For attaining the above-described objects, in the present invention, a control device for a continuously variable transmission which includes a belt wound around a primary pulley and a secondary pulley, and which is arranged to transmit a power to a driving wheel, the control device comprises: an engagement element arranged to connect and disconnect a power transmission between a power source and the driving wheel; a control means configured to output a hydraulic pressure command value, and to control a transmission gear ratio of the continuously variable transmission and an engagement state of the engagement element in accordance with a traveling state of a vehicle; a learning control means configured to perform a learning control of the engagement state of the engagement element with respect to the control command value; an oil vibration sensing means configured to sense an oil vibration; and a learning control prohibiting means configured to prohibit the learning control when the oil vibration sensing means senses the oil vibration.

Accordingly, when the oil vibration is sensed, the learning control of the engagement element is prohibited. It is possible to avoid the unnatural feeling according to the vibrating engagement during the learning control.

DESCRIPTION OF EMBODIMENTS

[First Embodiment]

Figure 1:
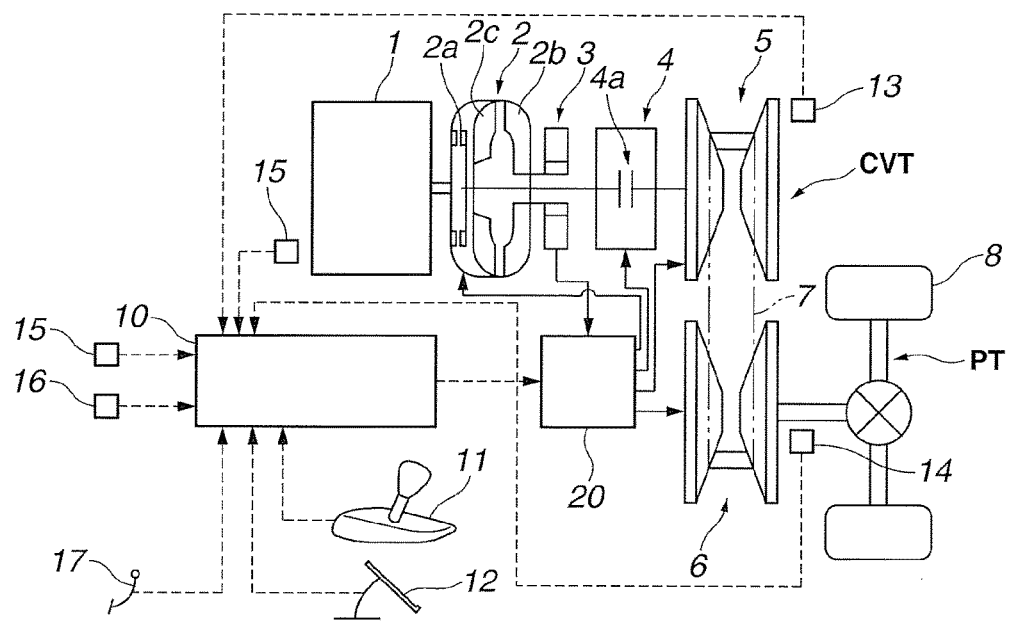
FIG. 1 is a system diagram showing a control device of a continuously variable transmission according to a first embodiment.

FIG. 1 is a system diagram showing a control device of a continuously variable transmission according to a first embodiment. A vehicle according to the first embodiment includes an engine 1 which is an internal combustion engine, and the continuously variable transmission. A driving force is transmitted through a differential gear to tires 8 which are driving wheels. A power transmitting path connected from a belt type continuously variable transmission mechanism CVT to the tires 8 is referred to as a power train PT.

The continuously variable transmission includes a torque converter 2, an oil pump 3, and a forward/rearward movement switching mechanism 4, and the belt type continuously variable transmission mechanism CVT. The torque converter 2 includes a pump impeller 2b connected to the engine 1, and arranged to rotate as a unit with a driving claw configured to drive the oil pump 3; a turbine runner 2c connected to an input side of the forward/rearward movement switching mechanism 4 (an input shaft of the belt type continuously variable transmission mechanism CVT); and a lock-up clutch 2a arranged to integrally connect the pump impeller 2b and the turbine runner 2c. The forward/rearward movement switching mechanism 4 includes a planetary gear mechanism, and a plurality of clutches. The forward/rearward movement switching mechanism 4 is arranged to switch the forward movement and the rearward movement in accordance with the engagement state of the clutch 4a. The belt type continuously variable transmission mechanism CVT includes a primary pulley 5 connected to an output side of the forward/rearward movement switching mechanism 4 (an input shaft of the continuously variable transmission); a secondary pulley 6 arranged to rotate as a unit with driving wheels; a belt 7 wound around the primary pulley 5 and the secondary pulley 6 to transmit the power; and a control valve unit 20 arranged to supply control pressures to hydraulic actuators.

A control unit 10 receives a range position signal (hereinafter, the range position signal is described as a P range, an R range, an N range, or a D range) from a shift lever 11 which is arranged to select a range position by an operation of a driver, an accelerator pedal opening degree signal (hereinafter, APO) from an accelerator pedal opening degree sensor 12, a brake pedal ON/OFF signal from a brake switch 17, a primary pulley pressure signal from a primary pulley pressure sensor 15 arranged to sense a hydraulic pressure of the primary pulley 5, a secondary pulley pressure signal from a secondary pulley pressure sensor 16 arranged to sense a pressure of the primary pulley 6, a primary pulley rotation speed signal Npri from a primary pulley rotation speed sensor 13 arranged to sense a rotation speed of a primary pulley 5, a secondary pulley rotation speed signal Nsec from a secondary pulley rotation speed sensor 14 arranged to sense a rotation speed of the secondary pulley 6, and an engine speed Ne from an engine speed sensor 15 arranged to sense an engine speed. Besides, the primary pulley rotation speed signal Npri is identical to the turbine rotation speed by the engagement of the clutch 4a in a case of the D range. Accordingly, hereinafter, the primary rotation speed signal Npri is also described as the turbine rotation speed Nt.

The control unit 10 controls the engagement state of the clutch 4a in accordance with the range position signal. That is, the control unit 10 is configured to control the clutch 4a to the disengagement state in case of the P range or the N range. The control unit 10 is configured to output a control signal to the control valve unit 20 in case of the R range so that the forward/rearward movement switching mechanism 4 outputs the reverse rotation, and thereby to engage the rearward clutch (or the brake). Moreover, the control unit 10 is arranged to output a control signal to the control valve unit 20 in case of the D range so that the forward/reverse movement switching mechanism 4 rotates as a unit to output the positive rotation, and thereby to engage the forward clutch 4a. Furthermore, the control unit 10 calculates a vehicle speed VSP based on the secondary rotation speed Nsec.

A shift map to attain an appropriate fuel economy state in accordance with a traveling state is set within the control unit 10. A target transmission gear ratio (corresponding to a predetermined transmission gear ratio) is set based on the APO signal and the vehicle speed VSP based on this shift map. It is controlled by the feed forward control based on the target transmission gear ratio. The actual transmission gear ratio is sensed based on the primary pulley rotation speed signal Npri and the secondary pulley rotation speed signal Nsec. The feedback control is performed so that the set target transmission gear ratio and the actual transmission gear ratio become identical to (corresponds to) each other. That is, the target primary rotation speed Npri* is calculated from the current vehicle speed VSP and the target transmission gear ratio. The transmission gear ratio is controlled so that the turbine rotation speed Nt (the engine speed at the engagement of the lock-up clutch 2a) becomes the target primary rotation speed Npri*. Moreover, the hydraulic pressure commands of the pulleys and the engagement pressure command of the lock-up clutch 2a are outputted to the control valve unit 20 by the feedback control, so that the hydraulic pressures of the pulleys and the lock-up pressure difference of the lock-up clutch 2a are controlled. Besides, in the first embodiment, a line pressure sensor is not provided within the control valve unit 20. When the line pressure is sensed, the line pressure is sensed from the command signal to a line pressure solenoid valve 30 (described later). However, the line pressure sensor may be provided to sense the line pressure.

An oil vibration sensing section is provided within the control unit 10. The oil vibration sensing section is arranged to sense the oil vibration based on the signals from the first primary pulley pressure sensor 15 and the second pulley pressure sensor 16. First, the voltage signals sensed by the primary pulley pressure sensor 15 and the secondary pulley pressure sensor 16 are converted to the hydraulic pressure signal. Direct current (DC) components (the variation components according to the control command) are eliminated by band pass filter operation. The only vibration components are extracted. Then, the amplitudes of the vibration components are calculated. In a case where a state in which the amplitude of the primary pulley pressure or the secondary pulley pressure is equal to or greater than the predetermined amplitude is continued during a predetermined time period, the oil vibration flag is brought to the ON state. On the other hand, when a state in which the amplitude is lower than the predetermined amplitude is continued during the predetermined time period, the oil vibration flag is brought to the OFF state.

Figure 2:
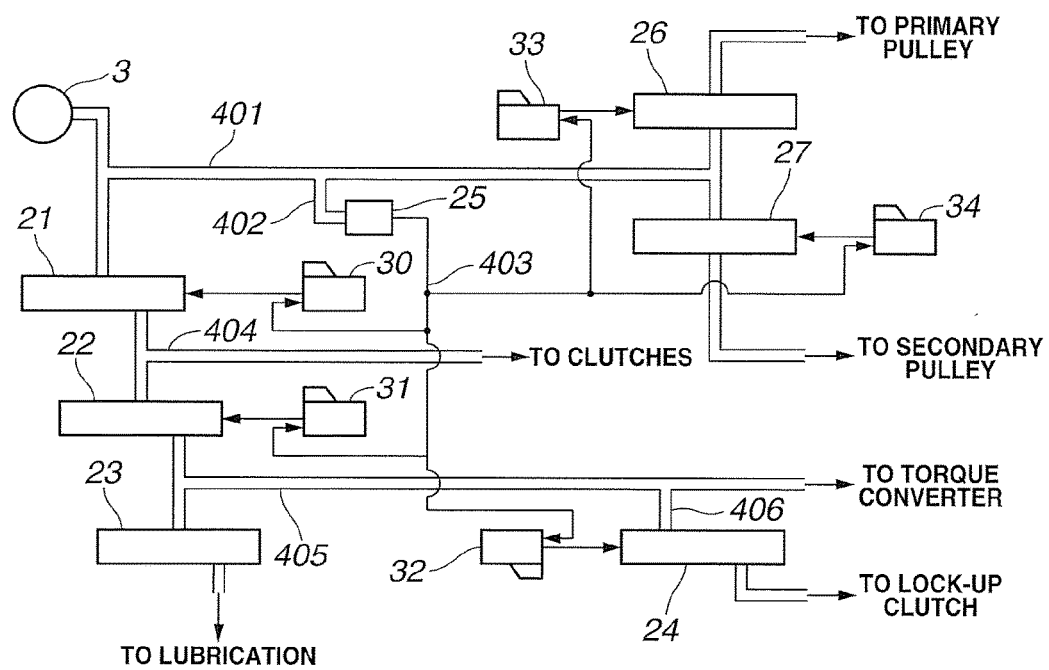
FIG. 2 is a hydraulic circuit diagram showing an outline (skeleton) within a control valve unit according to the first embodiment.

FIG. 2 is a hydraulic circuit diagram showing an outline within the control valve unit in the first embodiment. The pump pressure discharged from the oil pump 3 driven by the engine 1 is discharged to the hydraulic passage 401, and regulated to the line pressure by the pressure regulator valve 21. The hydraulic passage 401 is supplied, as the source pressures for the pulley hydraulic pressure, to the pulleys. A primary regulator valve 26 is connected to the hydraulic passage 401, and that pressure is regulated to the primary pulley pressure by the primary regulator valve 26. Similarly, a secondary regulator valve 27 is connected to the hydraulic passage 401, and that pressure is regulated to the secondary pulley pressure by the secondary regulator valve 27. A pilot valve 25 is provided in a hydraulic passage 402 bifurcated from the hydraulic passage 401. The pilot valve 25 generates a previously set first predetermined pressure (corresponding to a predetermined pressure in claim 1) from the line pressure, and outputs the first predetermined pressure to the pilot pressure hydraulic passage 403. With this, the source pressure of the signal pressures outputted from the solenoid valves (described later) are generated. Besides, when the line pressure is equal to or smaller than the first predetermined pressure, the line pressure and the pilot pressure are outputted as the same pressure.

The hydraulic passage 404 is connected to the pressure regulator valve 21, and that pressure is regulated to the engagement pressure of the clutch 4a by the clutch regulator valve 22. The hydraulic passage 405 is connected to a torque converter regulator valve 23, and that pressure is regulated to the converter pressure of the torque converter 2 by the torque converter regulator valve 23. The hydraulic passage 406 bifurcated from the hydraulic passage 405 is connected to a lock-up valve 24, and that pressure is regulated to the lock-up pressure of the lock-up clutch 2a by the lock-up valve 24. In the lock-up clutch 2a, the lock-up control is performed by the lock-up pressure difference which is a pressure difference between the converter pressure and the lock-up pressure. In this way, the clutch regulator valve 22 is provided on the downstream side of the pressure regulator valve 21. The torque converter regulator valve 23 is provided on the more downstream side. With this, even when the excessively large torque is inputted from the engine, the belt slippage of the belt type continuously variable transmission CVT is prevented by the slippage of the lock-up clutch 2a and the slippage of the clutch 4a.

The pilot pressure hydraulic passage 403 includes a line pressure solenoid valve 30 configured to control the line pressure; a clutch pressure solenoid valve 31 configured to control the clutch engagement pressure; a lock-up solenoid valve 32 configured to control the lock-up pressure; a primary solenoid valve 33 configured to control the primary pulley pressure; and a secondary solenoid valve 34 configured to control the secondary pulley pressure. The solenoid valves control the energization states of the solenoids based on the control signal outputted from the control unit 10 to supply the signal pressure by using the pilot pressure as the source pressure to the valves, so as to control the pressure regulation states of the valves.

In this case, problems when the oil vibration is generated within the control valve unit 20 are explained. As described above, various valves are provided within the control valve unit 20. The pressure regulator valve 21 is a valve arranged to regulate the highest hydraulic pressure discharged from the oil pump 3. Accordingly, the pressure regulator valve 21 is easy to receive the influence of the pump pulsation. A spool and so on constituting the pressure regulator valve 21 is vibrated in accordance with design specifications of valve diameter, an inertia, and so on, so that the line pressure may be vibrated (hereinafter, described as oil vibration). Moreover, the line pressure is set in accordance with the accelerator pedal opening degree APO. Accordingly, the line pressure is set to the low value when the accelerator pedal opening degree APO is small. The line pressure is set to the large value when the accelerator pedal opening degree APO is large.

Figure 3:
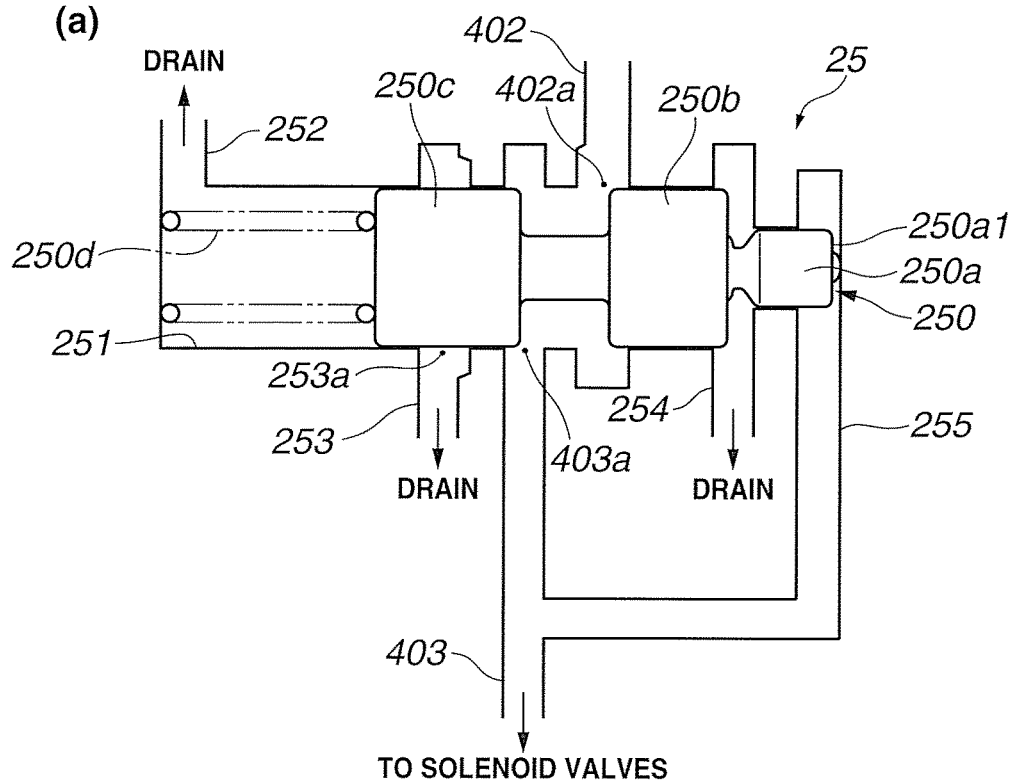
FIG. 3 are schematic views showing a construction of a pilot valve in the first embodiment.
Figure 3:
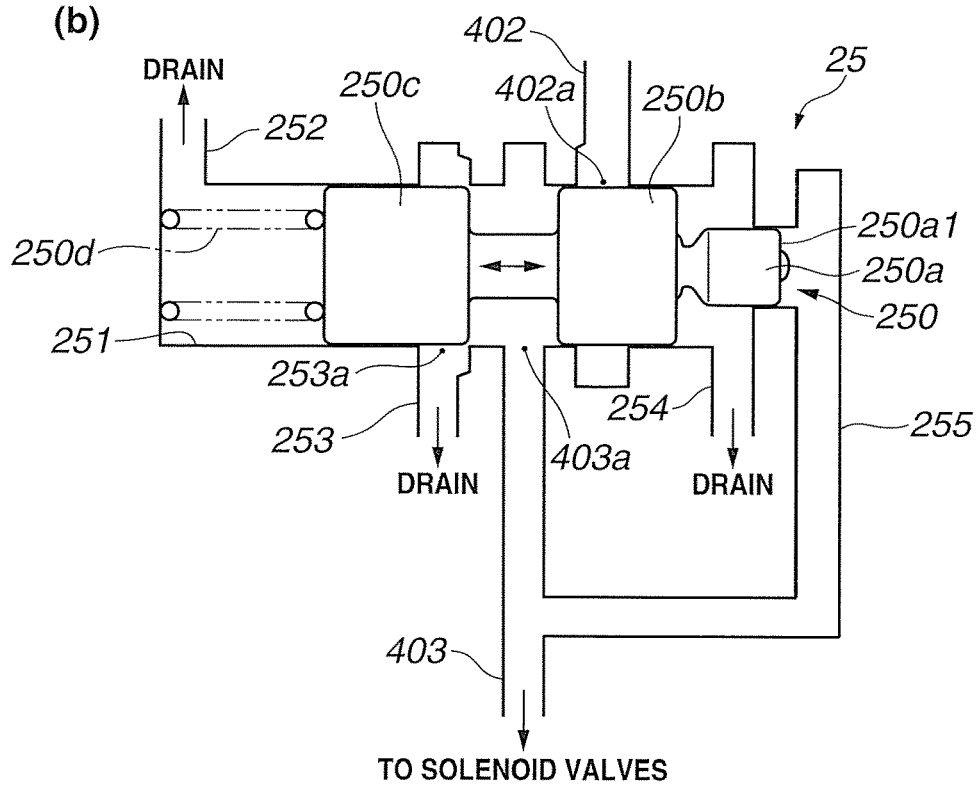

FIG. 3 are schematic views showing a structure of the pilot valve in the first embodiment. FIG. 3(a) shows an initial state before the generation of the hydraulic pressure. FIG. 3(b) shows a state when the pilot pressure is regulated. The components are illustrated by using the position relationship shown in FIG. 3(a). The pilot valve 25 includes a valve receiving hole 251 formed within the control valve unit; a spool valve 250 received within the valve receiving hole 251; and a spring 250d arranged to urge the spool valve 250 in one direction. The spool valve 250 includes a first spool 250a including a feedback pressure land portion 250a1 arranged to receive the hydraulic pressure supplied from a pilot pressure feedback circuit 255; a second spool 250b arranged to regulate an opening degree of the line pressure port 402a; and a third spool 250c arranged to regulate connection states with the pilot pressure port 403a and the drain port 253a.

The spring 250d is received between a bottom surface of the valve receiving hole 251 and the third spool 250c. The spring 250d urges on the pilot pressure feedback circuit 255's side. The spring 250d urges the spool valve 250 by the previously set predetermined spring set load. A drain circuit 252 is connected to the valve receiving hole 251 in which this spring 250d is received. Moreover, a drain circuit 254 is connected to a portion between the first spool 250a and the second spool 250b. When the spool valve 250 is moved, the drain circuit 254 allows a volume variation of a space between the second spool 250b and the valve receiving hole 251. In this way, the drain circuits are connected to the both sides of the spool valve 250. With this, it is possible to ensure the smooth operation of the spool valve 250.

When the line pressure is smaller than the first predetermined pressure which is the pilot pressure maximum value, it does not overcome the predetermined spring set load of the spring 250d, so that the spool valve 250 is not actuated. In this case, the hydraulic pressure is directly supplied from the line pressure port 402a to the pilot pressure port 403a. Consequently, the line pressure and the pilot pressure are the same. Next, when the line pressure is equal to or greater than the first predetermined pressure which is the pilot pressure maximum value, the spool valve 250 is started to be actuated as shown in FIG. 3(b). That is, the force generated by acting the hydraulic pressure of the pilot pressure feedback circuit 255 to the feedback pressure land portion 250a1 becomes greater than the predetermined spring set load. With this, the spool valve 250 is moved in the leftward direction of FIG. 3 (the spring 250d's side). With this, the opening of the line pressure port 402a becomes narrow by the second spool 250b. The line pressure is decreased by the orifice effect. The hydraulic pressure supplied to the pilot pressure feedback circuit 255 is also lowered. Moreover, when the line pressure is extremely high, the pilot pressure port 403a and the drain port 253a are connected by the movement of the third spool 250c. The line pressure supplied so that it becomes the pilot pressure is largely decreased from the drain circuit 253. In this way, the spool valve 250 is actuated by the pilot pressure supplied from the feedback circuit 255, so that the pilot pressure is regulated so as to have the first predetermined pressure which is the maximum value.

Figure 4:
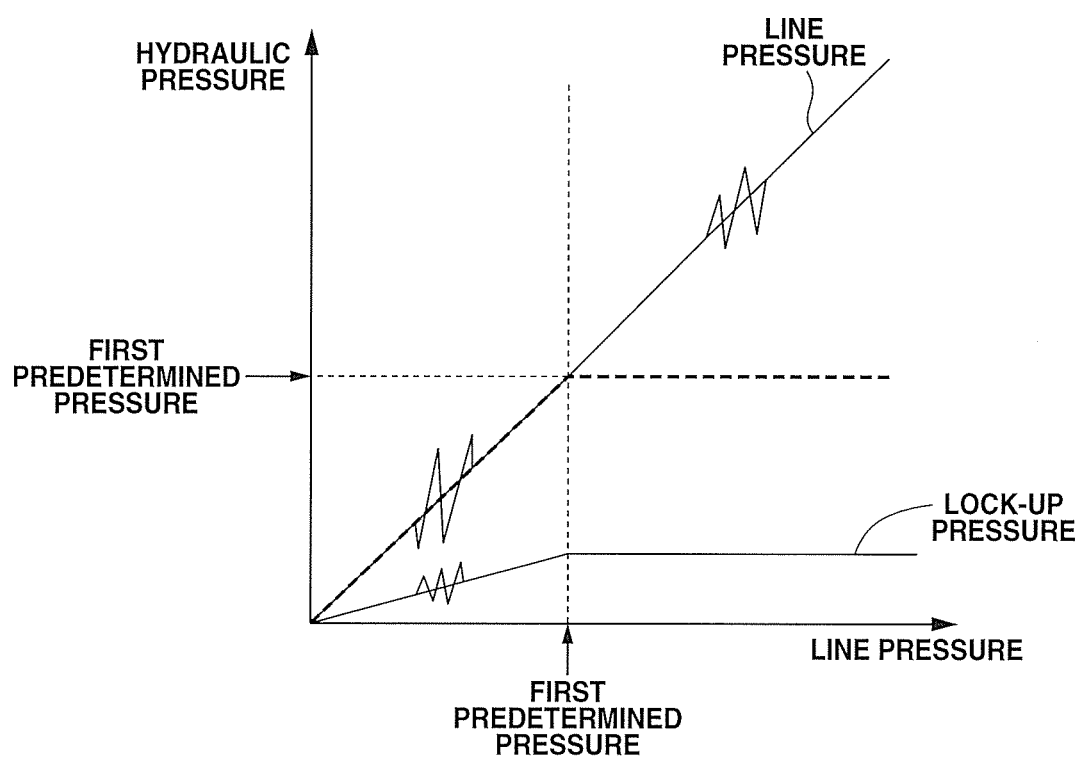
FIG. 4 is a characteristic view showing a relationship among a line pressure, a pilot pressure, and a lock-up pressure in the continuously variable transmission according to the first embodiment.

FIG. 4 is a characteristic view showing a relationship among the line pressure, the pilot pressure, and the lock-up pressure in the continuously variable transmission according to the first embodiment. A lateral axis represents the line pressure. A longitudinal axis represents the hydraulic pressure. The line pressure has a linear relationship. Besides, a slip lock-up control of the lock-up clutch 2a is controlled by the lock-up pressure difference (=the converter pressure-the lock-up pressure) between the converter pressure and the lock-up pressure. Accordingly, it is illustrated based on the lock-up pressure regulated based on the converter pressure. As illustrated in the hydraulic circuit structure of FIG. 2, the pilot pressure is a hydraulic pressure regulated based on the line pressure. The lock-up pressure is a hydraulic pressure regulated on the downstream side of the line pressure. In a region in which the line pressure is greater than the first predetermined pressure, the line pressure>the pilot pressure >the lock-up pressure is satisfied. Even when the oil vibration is generated in the line pressure, a small influence is imparted to the pilot pressure. The signal pressure outputted from the lock-up solenoid valve 34 is difficult to be influenced. Accordingly, there are few elements vibrated within the control valve. Consequently, the oil vibration is not increased due to the mutual interference within the control valve.

On the other hand, in a region where the line pressure is equal to or smaller than the first predetermined pressure, the line pressure=the pilot pressure>the lock-up pressure is satisfied. At this time, when the oil vibration is generated in the line pressure, the pilot pressure is also vibrated. Moreover, the converter pressure does not receive the influence since the converter pressure is lower than the line pressure. The lock-up solenoid valve 32 arranged to regulate the converter pressure to the lock-up pressure receives the influence of the vibrated pilot pressure. Accordingly, the signal pressure discharged from the lock-up solenoid valve 32 is influenced by the vibration of the pilot pressure. When the lock-up pressure is controlled, the influence of the oil vibration is received. In this way, when the oil vibration is generated in the region where the line pressure is equal to or smaller than the first predetermined pressure, the elements which are vibrated within the control valve are increased. Consequently, the oil vibration is increased by the mutual interference (interaction) within the control valve.

Hereinafter, the learning control is illustrated. In the control device for the continuously variable transmission according to the first embodiment, the engagement start timing with respect to the signal (for example, the lock-up command pressure signal, hereinafter described as D(n)) outputted to the lock-up solenoid valve 32 is learned and controlled for appropriately performing the engagement control of the lock-up clutch 2a. Specifically, the lock-up pressure difference is increased by increasing the lock-up command pressure signal D(n) to the lock-up clutch 2a by D1 when the D range is selected during the stop of the vehicle. Then, the lock-up command pressure signal D(n)

when the engine speed is pulled in is sensed. The lock-up command pressure signal D(n) which corresponds to the engagement start timing of the lock-up clutch 2a is stored to perform the learning control.

In this case, the lock-up pressure difference is vibrated by the oil vibration, the lock-up command pressure signal D(n) whose timing is different from the engagement start timing which is sensed when there is no oil vibration is stored. With this, the accuracy of the learning control may be deteriorated. Moreover, even when it is judged so that the decrease of the engine speed is stably grasped during the predetermined time period, the vibrating torque transmission may be generated from the engine 1 to the driving wheels during the predetermined time period. Even when the vehicle is stopped, the connection and the disconnection of the torque between the engine 1 and the driving wheels causes the variation and so on of the suspension. The unnatural feeling according to the acceleration vibration may be provided to the driver. Accordingly, in the first embodiment, when the oil vibration is generated, the learning control is prohibited.

Figure 5:
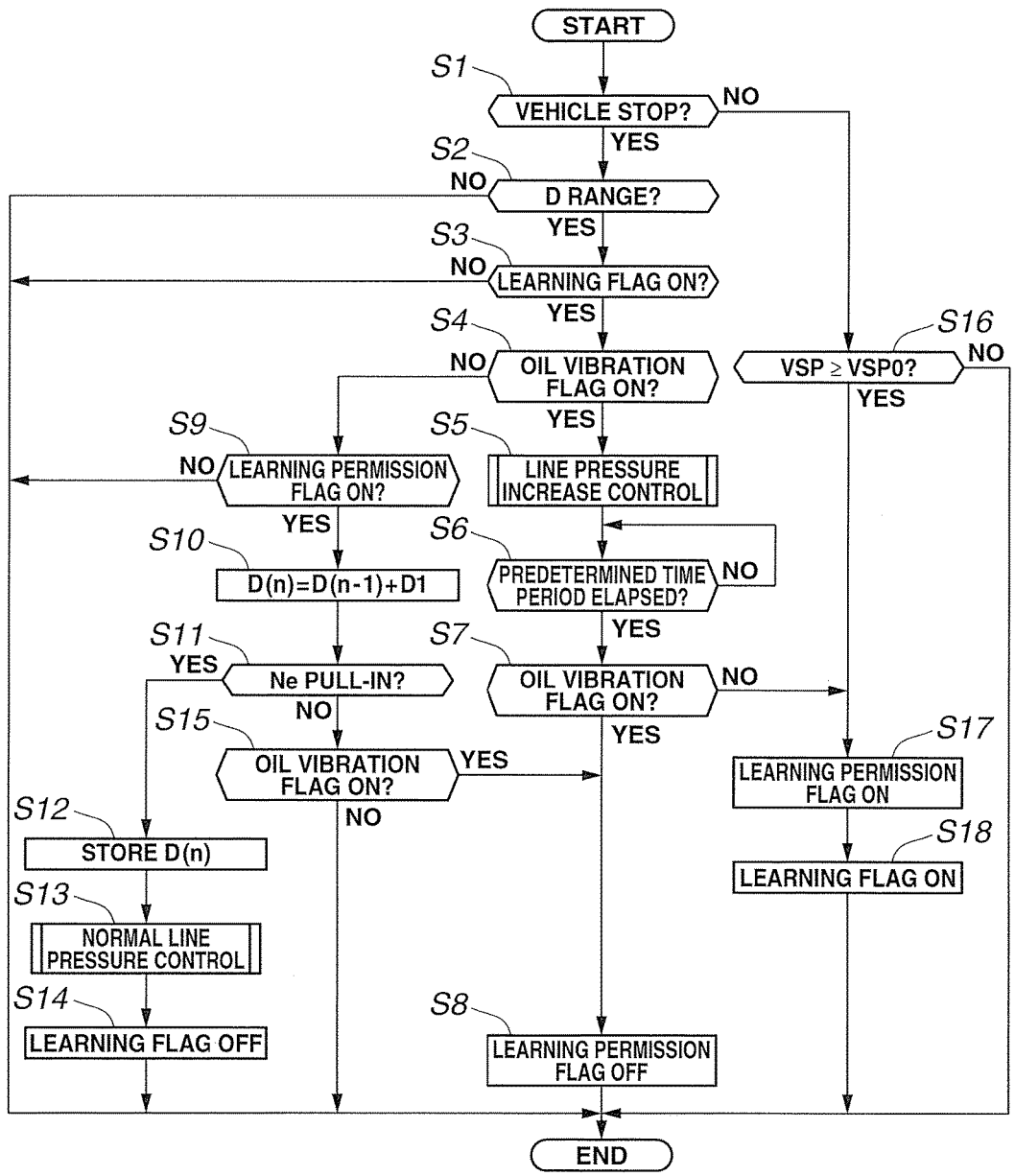
FIG. 5 is a time chart showing a learning control operation in the first embodiment.

FIG. 5 is a flowchart showing the learning control operation. In this case, the learning control flag shows whether or not the learning control is performed during the present stop of the vehicle. At a timing before the start of the learning control, the learning flag is set to the ON state. At a timing after the learning control, the learning flag is set to the OFF state during the present stop of the vehicle. Moreover, the learning permission flag is a flag indicative of the permission or the prohibition of the learning control. When the learning permission flag is the ON state, the learning control is permitted. When the learning permission flag is the OFF state, the learning control is prohibited. At the start of the ignition ON, the learning flag and the learning permission flag are set to the ON states.

(Learning Control Start Judgment Operation)

At step S1, it is judged whether or not the vehicle is during the stop. When the vehicle is stopped, the process proceeds to step S2. When the vehicle is traveling, the process proceeds to step S16.

At step S2, it is judged whether or not the range is the D range. When the range is the D range, the process proceeds to step S3. Otherwise, this control flow is finished. This is because the pull-in (drop) of the engine speed by the engagement of the lock-up clutch 2a can be sensed only at the power transmission permission state.

At step S3, it is judged whether or not the learning flag is in the ON state. When the learning flag is in the ON state, the process proceeds to step S4. When the learning flag is in the OFF state, this control flow is finished.

At step S4, it is judged whether or not the oil vibration flag is in the ON state. When the oil vibration flag is in the ON state, it is judged that the learning control should not be performed. The process proceeds to step S5. When the oil vibration flag is in the OFF state, the process proceeds to step S9 for performing the learning control.

(Operation at Generation of Oil Vibration)

At step S5, the line pressure increase control is performed. Specifically, the line pressure is set to the second predetermined pressure higher than the first predetermined pressure. This second predetermined pressure is a value obtained by adding, to the first predetermined pressure, the third predetermined pressure previously obtained by the experiment and so on in consideration of the amplitude of the oil vibration. With this, it is possible to suppress the energy consumption without excessively increasing the line pressure while further excluding the influence of the oil vibration on the pilot pressure. However, the second predetermined pressure may be the first predetermined pressure. Moreover, the amplitude of the line pressure is sensed, and the second predetermined pressure may be set in accordance with this amplitude. For example, the minimum value of the vibrating line pressure is sensed, and the second predetermined pressure is set so that that minimum value does not become lower than the first predetermined pressure.

At step S6, it is judged whether or not the previously set predetermined time period elapses. The line pressure increase control is continued until the predetermined time period elapses. When the predetermined time period elapses, the process proceeds to step S7.

(Learning Control Prohibition Judgment)

At step S7, it is judged again that the oil vibration flag is in the ON state. When the oil vibration flag is in the ON state, it is judged that it is not possible to suppress the oil vibration even when the line pressure is increased. The process proceeds to step S8. The learning permission flag is set to the OFF state. With this, the learning control is prohibited during the present stop of the vehicle, so as to avoid the learning control with the low accuracy. On the other hand, when the oil vibration flag is in the OFF state, the process proceeds to step S17. The process proceeds to step S18. The learning flag is set to the ON state.

At step S9, it is judged whether or not the learning permission flag is in the ON state. When the learning permission flag is in the ON state, the process proceeds to step S10. When the learning permission flag is in the OFF state, this control flow is finished.

(Learning Control)

At step S10, a value obtained by adding a predetermined value D1 to the previous lock-up command pressure signal D(n−1) is outputted to the lock-up solenoid valve 32 as the lock-up command pressure signal D(n) for sensing the clutch engagement start timing.

At step S11, it is judged whether or not there is the pull-in of the engine rotation speed Ne. When it is judged that there is the pull-in of the engine, it is judged that it reaches the engagement start timing. The process proceeds to step S12. Otherwise, the process proceeds to step S15. Besides, it is judged whether or not there is the pull-in of the engine speed Ne, for example, by the following manner. A variation rate of the engine speed Ne is calculated. A reference engine speed which is an average during the stop of the vehicle. It is judged that there is the pull-in of the engine speed Ne when the variation rate is smaller than a negative predetermined value, and when the actual engine speed becomes equal to or smaller than the reference engine speed by a predetermined rotation speed or more. Besides, it may be judged only by the engine speed Ne, or only by the variation rate. The judgment is not limited.

At step S12, the lock-up command pressure signal D(n) at the pull-in of the engine speed Ne is stored. With this, for example, when the engagement control of the lock-up clutch 2a is performed during the traveling of the vehicle, the control is performed by considering the stored lock-up command pressure signal D(n) as the engagement start timing. With this, the lock-up clutch control with high accuracy is attained.

At step S13, the normal line pressure control is performed. Besides, when the process reaches the step S14 in a state where the line pressure increase control is performed at step S5, it is switched from the line pressure increase control to the normal line pressure control.

At step S14, the learning flag is brought to the OFF state. The learning is prohibited during the present stop of the vehicle. With this, the unnatural feeling and the wasted energy consumption are avoided due to frequently performing the learning control during the stop of the vehicle.

(Prohibition Due to Oil Vibration During Learning Control)

At step S15, it is judged again whether or not the oil vibration flag is in the ON state during the learning control. When the oil vibration flag is in the ON state, the process proceeds to step S8. At step S8, the learning permission flag is brought to the OFF state. The learning control is prohibited. This is because it is possible to avoid the unnatural feeling according to the oil vibration near the engagement start timing when the oil vibration is sensed before the engagement start timing. Besides, when the learning permission flag becomes the OFF state, the learning control is prohibited during the present stop of the vehicle. Accordingly, it is possible to avoid the unnatural feeling according to the oil vibration.

(Flag Processing When It Is Got Out of Present Stop of Vehicle)

At step S16, it is judged whether or not the vehicle speed VSP is equal to or smaller than the predetermined vehicle speed VSP0 indicative of the start of the vehicle. When the vehicle speed VSP is equal to or greater than VSP0, it is judged that the vehicle is started. The process proceeds to steps S17 and S18. The learning permission flag is set to the ON state. The learning flag is set to the ON state. Otherwise, it is judged that the vehicle is during the stop. The process is finished.

That is, when the oil vibration is generated, the learning control is prohibited. With this, it is possible to attain the stable learning control, and to avoid the unnatural feeling to the driver. Moreover, even at the generation of the oil vibration, the oil vibration is attempted to be suppressed by increasing the line pressure. When the oil vibration is suppressed, the learning control is permitted, so that the learning opportunity can be ensured.

As illustrated above, in the embodiment, it is possible to attain the following functions and operations.

(1) In a belt type continuously variable transmission CVT which includes the belt 7 wound around the primary pulley 5 and the secondary pulley 6, and which is arranged to transmit the power to the tires 8, there are provided:

the lock-up clutch 2a (the engagement element) arranged to connect and disconnect the power transmission between the engine 1 (the power source) and the driving wheels;

the steps S10, S11, and S12 (the learning control means) configured to perform the learning control of the engagement state of the lock-up clutch 2a with respect to the control command value;

the oil vibration sensing section (the oil sensing means) configured to sense the oil vibration; and the steps S4 and S8 (the learning control prohibiting means) configured to prohibit the learning control when the oil vibration sensing section senses the oil vibration.

Accordingly, when the oil vibration is sensed, the learning control of the lock-up clutch 2a is prohibited. Consequently, it is possible to avoid the unnatural feeling according to the vibrating engagement during the learning control. Moreover, it is possible to perform the appropriate learning control without using the unreliable learning value during the oil vibration.

(2) At step S15, when the oil vibration flag becomes the ON state during the learning control, the learning control is stopped.

By sensing the oil vibration before reaching the engagement start timing, it is possible to avoid the unnatural feeling according to the oil vibration near the engagement start timing. Besides, when the learning permission flag becomes the OFF state, the learning control during the stop of the vehicle is prohibited. Accordingly, it is possible to avoid the unnatural feeling according to the oil vibration.

(3) There are provided the oil pump 3 and the pressure regulator valve 21 (the line pressure generating means) configured to generate the line pressure; the pilot valve 25 arranged to supply the pilot pressure regulated so as not to exceed the first predetermined pressure when the line pressure exceeds the first predetermined pressure; and the control unit 10 (the control means) configured to generate the pulley hydraulic pressure by controlling the solenoid valve by the pilot pressure.

The control unit 10 is configured to increase the line pressure to be greater than the first predetermined pressure at step S5 when the oil vibration is sensed at step S4. The control unit 10 is configured to cancel the prohibition of the learning control at step S17 when the oil vibration is not sensed for the increase the line pressure at step S7.

Accordingly, when the oil vibration is sensed, the learning opportunity is increased by attempting the suppression of the oil vibration by increasing the line pressure to be greater than the first predetermined pressure. Moreover, when the oil vibration flag becomes the OFF state by the increase of the line pressure, it is possible to ensure the learning control again. Consequently, it is possible to suppress the decrease of the reliability of the learning control.

(4) The engagement clutch is the lock-up clutch 2a of the torque converter 2 provided between the engine 1 and the belt type continuously variable transmission CVT.

As shown in the step S1, the learning control is the control performed during the stop of the vehicle.

The control unit 10 is configured to increase the line pressure to be greater than the first predetermined pressure at step S5. The control unit 10 is configured to set the learning permission flag to the OFF state when it is judged that the oil vibration flag is in the ON state at step S7 after the predetermined time period elapses at step S6. With this, the learning control during the stop of the vehicle is prohibited.

Accordingly, when the oil vibration cannot be suppressed, the learning control of the lock-up clutch 2a is not performed. Consequently, it is possible to suppress the decrease of the reliability of the learning control during the stop of the vehicle.

(5) At step S16, when the vehicle speed VSP becomes equal to or greater than the predetermined vehicle speed VSP0 indicative of the traveling state of the vehicle, the learning permission flag and the learning flag are brought to the ON states at steps S17 and S18. With this, the prohibition of the learning control is canceled.

When the vehicle is shifted from the stop state to the traveling state, the prohibition of the learning control is canceled. Accordingly, when the vehicle is stopped at the next time, it is possible to perform the learning control again. It is possible to ensure the opportunity of the learning control.

Hereinabove, the present invention is not limited to the above-described configuration although the present invention is explained based on the embodiment. The present invention can include the other configurations. For example, in the first embodiment, the present invention is applied to the control to learn the engagement start timing of the lock-up clutch during the stop of the vehicle. However, the present invention is applicable to the other clutches as long as they are the engagement elements. Moreover, the present invention is applicable to the learning control of the lock-up clutch during the traveling of the vehicle. Besides, when the learning control is performed during the traveling of the vehicle, it is desirable to consider the following points.

Figure 6:
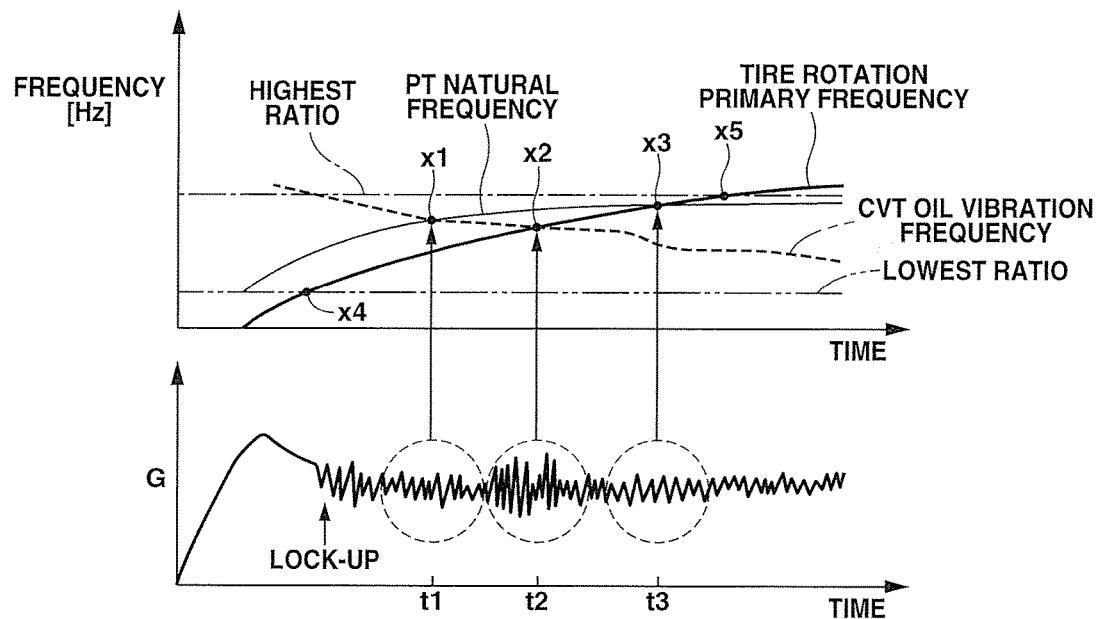
FIG. 6 is a time chart when the oil vibration is generated when the vehicle travels by engaging the lock-up clutch in a state where the line pressure is lower than the first predetermined pressure.

FIG. 6 is a time chart when the oil vibration is generated when the vehicle travels and the lock-up clutch is engaged in a state where the line pressure is smaller than the first predetermined pressure. In FIG. 5, a bold solid line is a tire rotation primary vibration frequency. A thin solid line is a natural frequency of the power train PT. A bold dotted line is an oil vibration frequency. One dot chain line is a natural frequency of the power train PT when the belt type continuously variable transmission CVT is the highest ratio. Two dot chain line is a natural frequency of the power train PT when the belt type continuously variable transmission CVT is the lowest ratio. In this case, the tire rotation primary frequency represents a primary frequency of the rotation vibration which is generated when the tires 8 are rotated, and which is easy to be felt by the occupant. Moreover, the natural frequency of the power train PT represents an elastic torsion natural frequency which the power train PT transmits the power through a shaft and so on to the tires 8. Besides, this natural frequency is varied to the high frequency side when the belt type continuously variable transmission mechanism CVT is the High side, and varied to the low frequency side when the belt type continuously variable transmission mechanism CVT is the Low side.

As shown in FIG. 6, the vibration of the line pressure influences the pilot pressure. The oil vibration frequency (for example, the line pressure frequency) within the control valve, and the tire rotation primary frequency and the natural frequency of the power train PT may be resonated. With this, the forward/rearward acceleration vibration of the vehicle may be increased. Therefore, in this first embodiment, the line pressure is increased when the oil vibration flag is in the ON state, when the line pressure is equal to or smaller than the first predetermined pressure, and when the resonance of the various vibrations may be generated.

As shown in FIG. 6, a point of intersection of the oil vibration frequency of the line pressure (represented by the CVT oil vibration frequency in FIG. 6) and the natural frequency of the power train PT is represented by x1 (a second traveling state). A point of intersection of the oil vibration frequency and the tire rotation primary frequency is represented by x2 (a first traveling state). A point of intersection of the natural frequency of the power train PT and the tire rotation primary frequency is represented by x3 (a third traveling state). A point of intersection of the tire rotation primary frequency and the Lowest rate natural frequency is represented by x4. A point of intersection of the tire rotation primary frequency and the Highest rate natural frequency is x5. Besides, these frequencies are determined by their design specifications (design specification of the pressure regulator valve, the pump characteristics, design specification of the power train PT, tire diameter, and so on).

As shown in the vibration state of the forward/rearward acceleration G of FIG. 6, when the vehicle is started and gradually accelerated, the transmission gear ratio of the belt type continuously variable transmission mechanism CVT is upshifted from the Lowest side to the Highest side based on the vehicle speed VSP and the accelerator opening degree APO. The natural frequency of the power train PT is increased in accordance with this upshift. The tire rotation primary frequency is also increased in accordance with the increase of the vehicle speed VSP. Then, the forward/rearward acceleration G is vibrated by the influence of the oil vibration after the lock-up clutch 2a is engaged.

At time t1, the natural frequency of the power train PT and the oil vibration frequency are easy to be resonated near the intersection point x1. The forward/rearward accelerator vibration is easy to be generated.

Moreover, at time t2, the tire rotation primary frequency and the oil vibration frequency are easy to be resonated near the intersection point t2. Furthermore, these are near the natural frequency of the power train PT. Accordingly, these and the natural frequency of the power train PT are easy to be resonated.

Moreover, at time t3, the tire rotation frequency and the natural frequency of the power train PT are easy to be generated at the intersection point x3. By this influence, the tire rotation primary frequency and the natural frequency of the power train PT may be resonated with the oil vibration frequency.

Figure 7:
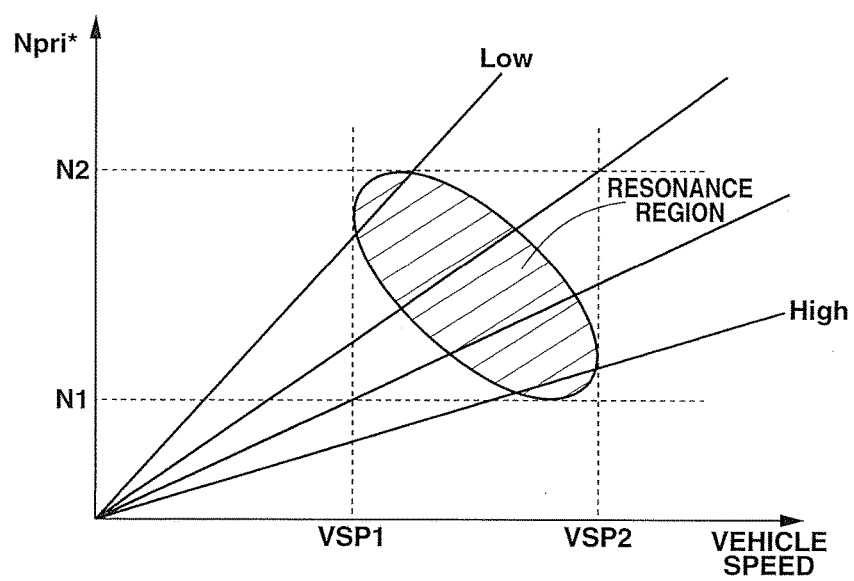
FIG. 7 is a characteristic view showing a region in which a natural frequency of a power train PT and a tire rotation primary frequency are resonated when the oil vibration is generated in a state where the line pressure is lower than the first predetermined pressure.

FIG. 7 is a characteristic view showing a region in which the natural frequency of the power train PT and the tire rotation primary frequency are resonated when the oil vibration is generated in a state where the line pressure is smaller than the first predetermined pressure. It has been discovered that the resonance region near the intersection point x1 and the intersection point x2 exist in a region where the vehicle speed VSP is defined from VSP1 to VSP2, and in a region where the target primary rotation speed Npri* is defined from N1 to N2.

Accordingly, this traveling state which has the intersection point x1, x2 and x3, and which induces the resonance is specified by the regions of the target primary rotation speed Npri* and the vehicle speed VSP. The learning control during the traveling of the vehicle may be prohibited when the oil vibration is sensed in the region of the above-described target primary rotation speed Npri* and the above-described vehicle speed VSP. Moreover, the opportunity of the learning may be ensured by attempting to dissolve the oil vibration by increasing the line pressure to be greater than the first predetermined pressure. With this, it is possible to avoid the learning control in a state where the oil vibration is generated in the line pressure, and to ensure the accuracy of the learning control. Moreover, in a case where the learning control is performed by increasing the line pressure to be greater than the first predetermined pressure, it is possible to exclude the increase of the oil vibration due to the mutual interference within the control valve, and to suppress the resonance with the other vibration components. Besides, when the traveling state is determined based on the target primary rotation speed Npri* and the vehicle speed VSP, it may be determined, for example, by the traveling state including the intersection points x4 and x5. The intersection points x4 and x5 can be determined by the design specifications. The intersection points x4 and x5 can cover the entire region in which the natural frequency of the power train PT and the tire natural primary frequency may be resonated. This is because the region including these intersection points x4 and x5 causes the resonance due to the relationship between the oil vibration frequency, and the natural frequency of the power train PT and the tire rotation primary frequency.

In this way, it is possible to exclude the influence of the oil vibration by increasing the line pressure in the traveling state in which it is conceivable to include the intersection points x1, x2, and x3, when the oil vibration flag is in the ON state, and when the line pressure is smaller than the predetermined pilot pressure. With this, it is possible to suppress the resonance with the tire rotation primary frequency and the natural frequency of the power train PT, and to attain the stable learning control.

Moreover, in the first embodiment, the present invention is applied to the learning control of the lock-up clutch. However, the present invention is applicable to the learning control in the engagement element such as a start clutch which is arranged to be engaged during the traveling of the vehicle, or the engagement element for the shift of the stepped variable automatic transmission. In this case, in a case where the learning control is performed during the traveling of the vehicle, it is desirable to consider the above-described resonance region.

The invention claimed is:

1. A control device for a continuously variable transmission which includes a belt wound around a primary pulley and a secondary pulley, and which is arranged to transmit power to a driving wheel, the control device comprising:
   a lock-up clutch of a torque converter which is arranged to connect and disconnect a power transmission between a power source and the driving wheel;
   a control section configured to output a hydraulic pressure command value, and to control a transmission gear ratio of the continuously variable transmission and an engagement state of the lock-up clutch in accordance with a traveling state of a vehicle;
   a learning control section configured to perform a learning control of the engagement state of the lock-up clutch with respect to the hydraulic pressure command value;
   an oil vibration sensing section configured to sense an oil vibration of a line pressure; and
   a learning control prohibiting section configured to prohibit the learning control when the oil vibration sensing section senses the oil vibration of the line pressure when the vehicle is in a drive (D) range or in a forward traveling state.

2. The control device for the continuously variable transmission as claimed in claim 1, wherein the learning control section is configured to stop the learning control when the oil vibration sensing section senses the oil vibration of the line pressure during the learning control by the learning control section.

3. The control device for the continuously variable transmission as claimed in claim 1, further comprising:
   a line pressure generating section configured to generate the line pressure, and a pilot valve configured to supply a pilot pressure regulated so as not to be greater than a first predetermined pressure when the line pressure exceeds the first predetermined pressure,
   wherein the control section is configured to generate a pulley hydraulic pressure by controlling a solenoid valve by the pilot pressure; and
   wherein the learning prohibiting section is configured to increase the line pressure to be greater than the first predetermined pressure when the oil vibration sensing section senses the oil vibration, and to cancel prohibition of the learning control when the oil vibration is not sensed during the increase of the line pressure.

4. The control device for the continuously variable transmission as claimed in claim 3, wherein:
   the lock-up clutch is provided between an engine and the continuously variable transmission;
   the learning control section is configured to perform the learning control of the engagement state of the lock-up clutch with respect to the hydraulic pressure command value during a stop of the vehicle; and
   the learning control prohibiting section is configured to prohibit the learning control during the stop of the vehicle when oil vibration of the line pressure is sensed after a predetermined time period elapses after the line pressure is increased to be greater than the first predetermined pressure.

5. The control device for the continuously variable transmission as claimed in claim 4, wherein the learning control prohibiting section is configured to cancel prohibition of the learning control when the vehicle speed becomes equal to or greater than a predetermined vehicle speed indicative of the traveling state of the vehicle.

6. A control device for a continuously variable transmission which includes a belt wound around a primary pulley and a secondary pulley, and which is arranged to transmit power to a driving wheel, the control device comprising:
   a lock-up clutch of a torque converter which is arranged to connect and disconnect a power transmission between a power source and the driving wheel; and
   a control unit configured to
      output a hydraulic pressure command value, and control a transmission gear ratio of the continuously variable transmission and an engagement state of the lock-up clutch in accordance with a traveling state of a vehicle;
      perform a learning control of the engagement state of the lock-up clutch with respect to the hydraulic pressure command value;
      sense, in response to a signal received from at least one pressure sensor, oil vibration of a line pressure; and
      prohibit the learning control when the oil vibration of the line pressure is sensed when the vehicle is in a drive (D) range or in a forward traveling state.

7. The control device for the continuously variable transmission as claimed in claim 6, wherein the control unit is configured to stop the learning control when the oil vibration of the line pressure is sensed during the learning control.

8. The control device for the continuously variable transmission as claimed in claim 6, further comprising:
   a pump and a pressure regulator configured to generate the line pressure; and
   a pilot valve configured to supply a pilot pressure regulated so as not to be greater than a first predetermined pressure when the line pressure exceeds the first predetermined pressure,
   wherein the control unit is configured to
      cause a pulley hydraulic pressure to be generated by controlling a solenoid valve by the pilot pressure;
      increase the line pressure to be greater than the first predetermined pressure when the oil vibration is sensed; and
      cancel prohibition of the learning control when the oil vibration is not sensed during the increase of the line pressure.

9. The control device for the continuously variable transmission as claimed in claim 8, wherein:
   the lock-up clutch is provided between an engine and the continuously variable transmission; and
   the control unit is configured to
      perform the learning control of the engagement state of the lock-up clutch with respect to the hydraulic pressure command value during a stop of the vehicle; and
      prohibit the learning control during the stop of the vehicle when oil vibration of the line pressure is sensed after a predetermined time period elapses after the line pressure is increased to be greater than the first predetermined pressure.

10. The control device for the continuously variable transmission as claimed in claim 9, wherein the control unit is configured to cancel prohibition of the learning control when the vehicle speed becomes equal to or greater than a predetermined vehicle speed indicative of the traveling state of the vehicle.

\* \* \* \* \*